US008626916B2

(12) United States Patent
Armstrong et al.

(10) Patent No.: US 8,626,916 B2
(45) Date of Patent: Jan. 7, 2014

(54) HANDHELD FIELD MAINTENANCE TOOL WITH PROCESS COMMUNICATION TUNNEL

(75) Inventors: Stephen Armstrong, Savage, MN (US); Todd Toepke, Eden Prairie, MN (US); Scott Hokeness, Lakeville, MN (US); Donald Lattimer, Chaska, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 155 days.

(21) Appl. No.: 13/186,872

(22) Filed: Jul. 20, 2011

(65) Prior Publication Data

US 2013/0024495 A1 Jan. 24, 2013

(51) Int. Cl.
*G06F 13/00* (2006.01)

(52) U.S. Cl.
USPC .......................... 709/225; 709/227; 709/250

(58) Field of Classification Search
USPC .................. 709/223, 224, 225, 227, 228, 250
See application file for complete search history.

(56) References Cited

U.S. PATENT DOCUMENTS

| | | | |
|---|---|---|---|
| 6,560,513 B2 | 5/2003 | Krause et al. | 700/264 |
| 8,107,879 B2 * | 1/2012 | Pering et al. | 455/41.1 |
| 2005/0062677 A1 * | 3/2005 | Nixon et al. | 345/2.1 |
| 2006/0183462 A1 * | 8/2006 | Kolehmainen | 455/411 |
| 2008/0080395 A1 * | 4/2008 | Law et al. | 370/254 |
| 2010/0265061 A1 * | 10/2010 | Harmon et al. | 340/539.13 |
| 2010/0290084 A1 * | 11/2010 | Russell et al. | 358/1.15 |
| 2011/0039494 A1 * | 2/2011 | Shon et al. | 455/41.1 |
| 2012/0253477 A1 * | 10/2012 | Hodson | 700/12 |

OTHER PUBLICATIONS

Product Data Sheet: 475 Field Communicator. Jul. 2009 by Emerson Process Management.
First Office Action from the corresponding Chinese patent application No. 201120363816.2 dated Feb. 24, 2012.
International Search Report and Written Opinion from the corresponding International application No. PCT/US2012/038586 dated Jan. 31, 2013.

* cited by examiner

*Primary Examiner* — Viet Vu
(74) *Attorney, Agent, or Firm* — Kelly, Holt & Christenson, PLLC

(57) ABSTRACT

A method of interacting with a process control system is provided. The method includes bringing a mobile electronic device into physical proximity of a field device. The mobile electronic device is coupled to a digital process communication channel of the field device. A client software application is initiated on the mobile electronic device. The digital process communication channel is used to communicatively couple the client software application to a host application remote from both the mobile electronic device and the field device.

17 Claims, 5 Drawing Sheets

HANDHELD FIELD MAINTENANCE TOOL WITH PROCESS COMMUNICATION TUNNEL

BACKGROUND

Field devices are used in a variety of process installations to provide extremely important process monitoring and control functions. Examples of process installations include petroleum, pharmaceutical, chemical, pulp, and other fluid processing installations. In such installations, the process control and measurement network may include tens or even hundreds of various field devices that periodically require maintenance to ensure that such devices are functioning properly and/or calibrated. Moreover, when one or more errors in the process control and measurement installation are detected, the use of a handheld field maintenance tool allows a technician to quickly diagnose such errors in the field. Handheld field maintenance tools are generally used to configure, calibrate, and diagnose problems relative to intelligent field devices using digital process communication protocols.

Since at least some process installations may involve highly volatile, or even explosive, environments, it is often beneficial, or even required, for field devices and the handheld field maintenance tools used with such field devices to comply with Intrinsic Safety requirements. These requirements help ensure that compliant electrical devices will not generate a source of ignition even under fault conditions. One example of an Intrinsic Safety requirement is set forth in: APPROVAL STANDARD INTRINSICALLY SAFE APPARATUS AND ASSOCIATED APPARATUS FOR USE IN CLASS I, II, and III, DIVISION NUMBER 1 HAZARDOUS (CLASSIFIED) LOCATIONS, CLASS NUMBER 3610, promulgated by Factory Mutual Research October, 1998. An example of a handheld field maintenance tool that complies with Intrinsic Safety requirements includes that sold under the trade designation Model 475 Field Communicator, available from Emerson Process Management of Austin, Tex.

While intelligent field devices and handheld field maintenance devices have provided a variety of new functions and capabilities with respect to handheld field maintenance, some functions are still somewhat cumbersome. For example, the task of commissioning field devices (connecting them for the first time) for a process control system is typically a two-person operation. One person is out in the field connecting the field device and the other person is in the control room monitoring the control system display or displays to see if the connections are successful. Proving a system and method that could transform heretofore two-person field maintenance tasks to single-person tasks would facilitate handheld field maintenance. Moreover, such a system could also generally provide enhanced interaction with the process control system itself.

SUMMARY

A method of interacting with a process control system is provided. The method includes bringing a mobile electronic device into physical proximity of a field device. The mobile electronic device is coupled to a digital process communication channel of the field device. A client software application is initiated on the mobile electronic device. The digital process communication channel is used to communicatively couple the client software application to a host application remote from both the mobile electronic device and the field device.

DETAILED DESCRIPTION OF ILLUSTRATIVE EMBODIMENTS

Intelligent field devices typically use an industrial communication protocol often called a fieldbus to communicate with the control system. The fieldbus is generally optimized for process control functions performed by the field device. The person in the field (such as a technician) will typically use a special purpose handheld field maintenance tool called a field communicator to communicate with the field device over the fieldbus using a process industry standard communication protocol to make adjustments to the field device that are necessary to prepare it for connection to the control system or to perform its specific function in the control system. As set forth above, at least some tasks of handheld field maintenance currently require two people. However, in accordance with some embodiments of the present invention, the need for a person in a control room may be eliminated if a suitable remote terminal or connection is provided to the technician in the field for tasks currently being done in the control room. While some embodiments of the present invention could be practiced with the functionality of a laptop or tablet computer using a wireless connection back to the control system host running software that performs the functions of the workstation(s) being used in the control room, it is preferred to use a handheld field maintenance tool. This is because the physical requirement of a laptop or tablet computer would provide just another device that the technician would need to carry. Further, since at least some process installations have highly volatile environments, the need for an intrinsically safe device would be required. While tablet computers and laptop computers are common, intrinsically safe computers are special-purpose devices that are very expensive and complex.

Figure 1:
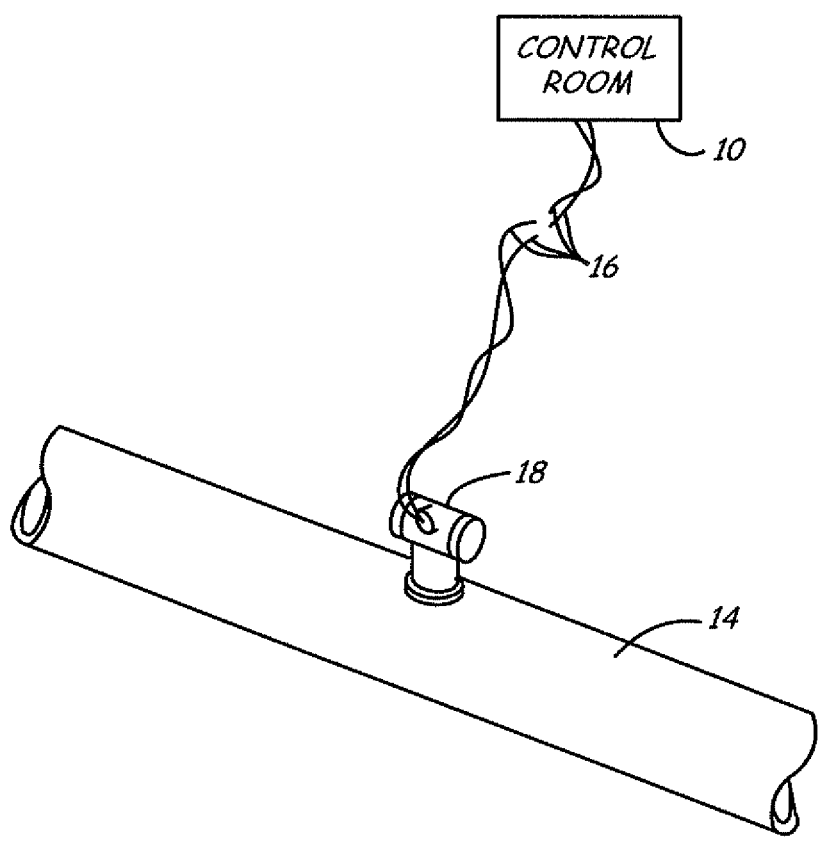
FIG. 1 is a diagrammatic view of a process control and monitoring system with which embodiments of the present invention are particularly useful.

FIG. 1 is a diagrammatic view of a process control and monitoring system with which embodiments of the present invention are particularly useful. Control room 10 is coupled to one or more field devices 18 via a process communication loop 16. Field device 18 is illustratively depicted as a process fluid pressure sensor mounted to process fluid conduit 14. However, a variety of process fluid variable generators, such as process fluid temperature sensors, process fluid flow sensors, et cetera, are known. Control room 10 is illustrated simply as a rectangular box. In reality, control room 10 is a location that is physically spaced from the volatile, and potentially explosive, atmosphere of the process installation. Moreover, control room 10 may include one or more workstations or personal computers that operate process control software and/or asset management software. The one or more various workstations and computers disposed within control room 10 are generally communicatively coupled together via a data communication network, such as an Ethernet network.

Process control loop 16 is generally a special form of communication network. This is because the communication through loop 16 is generally done in an energy-limited fashion in order to ensure that energy levels are kept low enough to ensure that no sources of ignition can be provided to the potentially explosive environment. Examples of known process communication or control loop protocols include the Highway Addressable Remote Transducer (HART®) Protocol, FOUNDATION™ Fieldbus, PROFIBUS-PA, et cetera.

As set forth above, for some tasks relative to the maintenance of a process control system, it is generally necessary for a technician to travel into the field proximate the location of a field device, such as process fluid pressure transmitter 18, to provide maintenance to that field device. Generally, a handheld field maintenance tool is used by a technician to interact with the field device.

Figure 2A:
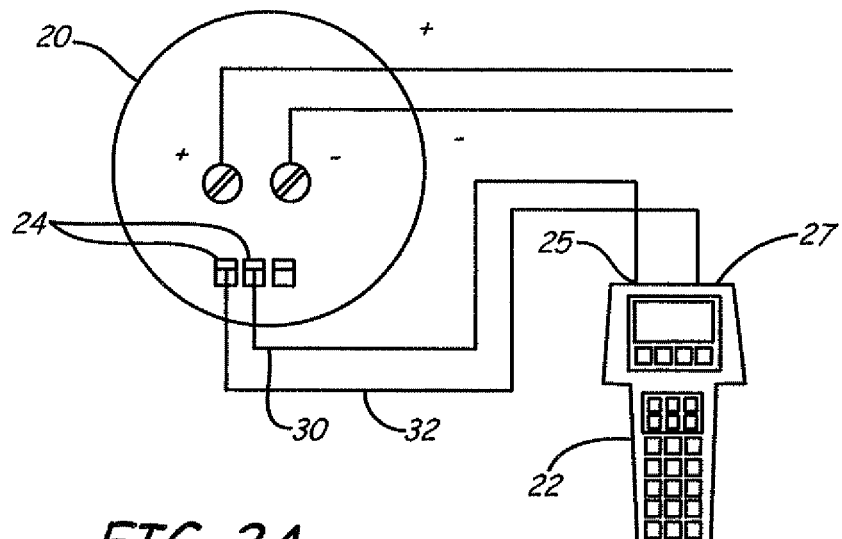
FIGS. 2A and 2B are diagrammatic views of a handheld field maintenance tool 22 coupled to field device is in accordance with the prior art.
Figure 2B:
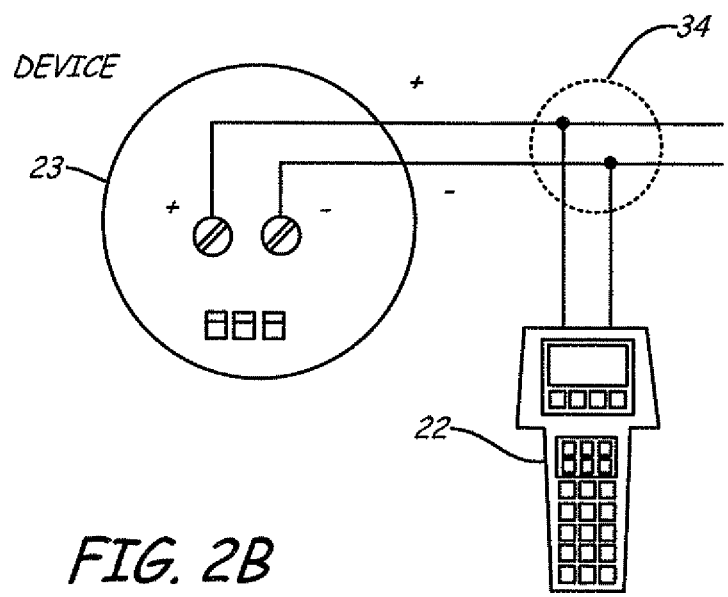

FIGS. 2A and 2B are diagrammatic views of a handheld field maintenance tool 22 coupled to field device is in accordance with the prior art. As shown in FIG. 2A, handheld field maintenance tool includes a pair of terminals 25, 27 that couple to task leads 30, 32, respectively, which are then are coupled to terminals 24 of field device 20. Terminals 24 may be dedicated terminals to allow such a handheld field maintenance tool to couple to device 20 and interact with device 20.

FIG. 2B shows an alternate arrangement where handheld field maintenance tool 22 couples directly to the process control loop 34 to which field device 23 is coupled. In either case, the wired connection between the handheld field maintenance tool and the field device allows the handheld field maintenance tool to interact with the desired field device 20, 23. More recently, wireless process communication protocols, such as WirelessHART have been provided. Handheld field maintenance tools are also beginning to take advantage of these wireless technologies to interact with wirelessly-communicating field devices.

Maintenance technicians and mobile workers typically perform duties in plant environments using tools such as handheld field maintenance tools. These tools can be synchronized with host asset management applications such as AMS device manager, available from Emerson Process Management of Austin, Tex., for the exchange of field device configuration information. However, when the handheld field maintenance tool is used in the field and is attached to a fieldbus network (HART®, FOUNDATION™ fieldbus, PROFIBUS-PA, or other network involving digital communications protocols), the handheld field maintenance tool does not have access to historical or other information regarding instruments being examined. Applications such as AMS Device Manager contain a wealth of asset information not usually stored on the handheld field maintenance tool, such as current and historical configuration data, device changes, current and historical alert information, product data sheets, current and historical calibration information, as well as user-entered information such as drawings and notes.

Embodiments of the present invention generally leverage the digital communication channel necessarily present at each field device to provide a communication channel to a handheld field maintenance tool. The fact that the handheld field maintenance tool is connected to a fieldbus network means that communications could technically be established with a host application running on a host computer or higher-level plant network and allow the tool to act as a client application if the appropriate application software is provided on both the handheld field maintenance tool and the host computer. While embodiments of the present invention can be practiced with a laptop or tablet computer providing a direct Wi-Fi connection back to the control system host network running software that performs the functions of the work stations being used in the control room, preferred embodiments generally include a handheld field maintenance tool that communicatively couples with the host computer. Since the handheld field maintenance tool is already required to perform the tasks necessary to commission field devices, a preferred embodiment in comparison to a laptop or tablet is to enable the handheld field maintenance tool to perform the functions of the workstation being used in the control room. One manner in which this can be provided is for the handheld field maintenance tool to use a simple software application running in the processor of the handheld field maintenance tool that connects as a remote terminal or thin-client, while the handheld field maintenance tool is located out in the field, to a server application in the control room, where the majority of the computational work is done by the workstation(s) in the control room.

Figure 3:
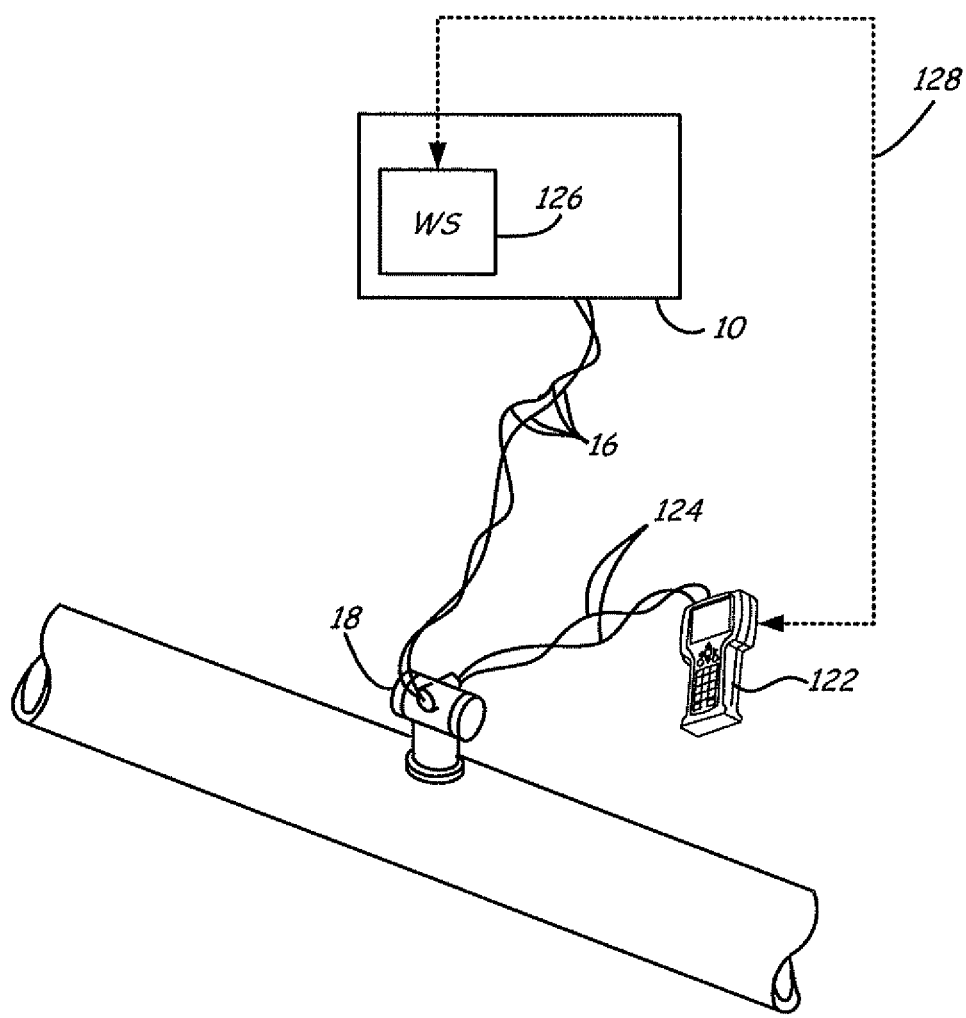
FIG. 3 is a diagrammatic view of a handheld field maintenance tool or mobile device physically coupled to field device.

FIG. 3 is a diagrammatic view of a handheld field maintenance tool or mobile device 122 physically coupled to field device 18 by virtue of dashed connection 124. Wired connection 124 allows handheld field maintenance tool 122 to communicate over process communication loop 16. More particularly, for process installations that employ digital process communication protocols, such as the Highway Addressable Remote Transducer (HART®) Protocol, or the FOUNDATION™ Fieldbus, handheld field maintenance tool 122 is able to communicate digitally with devices coupled to process communication loop 16. Industry standard process communication protocols utilize communication technologies that are able to, in some instances, wholly power connected field devices. Moreover, such protocols can be used with field devices that comply with intrinsic safety specifications such as that set forth above. While the embodiment illustrated in FIG. 3 is preferred, embodiments of the present invention are also applicable to wireless process communication techniques as well. For example, field device 18, instead of having a wired connection to a process communication loop may include wireless process communication circuitry, such as WirelessHART communication set forth in International Standard (IEC 62591). This standard uses wireless communication, at the 2.4 GHz frequency, but otherwise employs the same command structure as that used in wired HART communication. While the WirelessHART protocol is one example of a wireless process communication protocol, other standards can be employed in accordance with embodiments of the present invention. Additional details of the WirelessHART specification are published by the HART Communications Foundation. Relevant portions of the WirelessHART specification include: HCF_Spec 13, revision 7.0; HART Specification 65—Wireless Physical Layer Specification; HART Specification 75—TDMA Data Link Layer Specification (TDMA refers to Time Division Multiple Access); HART Specification 85—Network Management Specification; HART Specification 155—Wireless Command Specification; and HART Specification 290—Wireless Devices Specification. Accordingly, suitable radio-frequency communication circuitry within handheld device 122 may be able to communicate in accordance with a wireless process communication protocol, such as WirelessHART.

By virtue of the field device's location, it can be assumed with certainty that a communicative link is possible via either a wired process communication link, or a wireless process communication link. Leveraging this knowledge, handheld field maintenance tool 122 is able to join or otherwise communicate over the process communication loop through which field device 18 communicates, or will communicate. Accordingly, by virtue of its communicative coupling, handheld field maintenance tool 122 or mobile device is able to establish communication through the process communication loop to a host computer (illustrated diagrammatically at reference numeral 126). While the communicative coupling of the mobile device or handheld field maintenance tool 122 to work station 126 may be performed using either wired process communication, or wireless process communication, a communication channel or link 128 is obtained between the device 122 and work station 126, regardless. Link 128 may be created using the appropriate communications protocol specific to the type of fieldbus network for field device 18. For example, some form of pass-through or embedded message may be used within the allowable payloads of the specific process communication protocol. For example, the techniques taught in U.S. Pat. No. 6,370,448 for communicating HTTP, or other suitable information, over a process communication loop can be employed in accordance with embodiments of the present invention.

Figure 4:
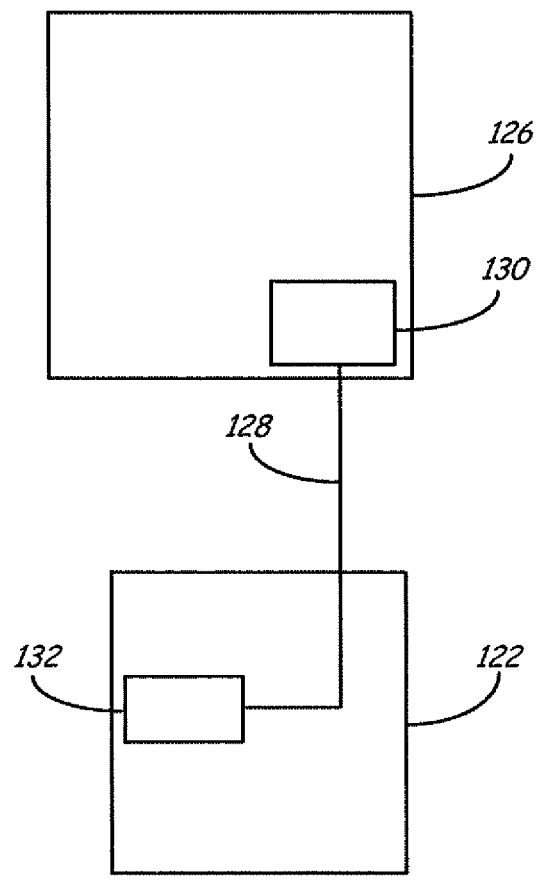
FIG. 4 is a diagrammatic view of a handheld field maintenance tool coupled to workstation.

FIG. 4 is a diagrammatic view of a handheld field maintenance tool 122 of FIG. 3 coupled to workstation 126 via communicative coupling 128. FIG. 4 illustrates a thin-client 132 running within tool 122. Thin-client 132 is a computer program executing upon the processor of handheld field maintenance tool 122 that depends heavily on thin-client server module 130 running within workstation 126 to fulfill its computational role. For example, in one embodiment, handheld field maintenance tool 122 is that sold under the trade designation, 475 Field Communicator available from Emerson Process Management of Eden Prairie, Minn. That device runs on Windows CE, a robust, real-time operating system. Accordingly, in one embodiment, thin-client 132 includes remote desktop connection or terminal services client software 132 suitable for operation on the Windows CE operating system. In such embodiment, workstation 126 runs a Microsoft Windows-based operating system, such as Windows 7 and provides a server daemon or process 130. When thin-client 132 is executing within handheld field maintenance tool 122 and coupled to server daemon 130, thin-client 132 can present, on the display of handheld field maintenance tool 122, a display that corresponds to that currently shown on the display of workstation 126. Additionally, user inputs, such as key presses and stylus or cursor positioning on handheld field maintenance tool 122 are instead transferred to and injected into workstation 126. In this way, the handheld field maintenance tool becomes an extension of the user interface for work station 126 thereby allowing the technician to interact with the control system and/or asset management system to which work station 126 is coupled.

Figure 5:
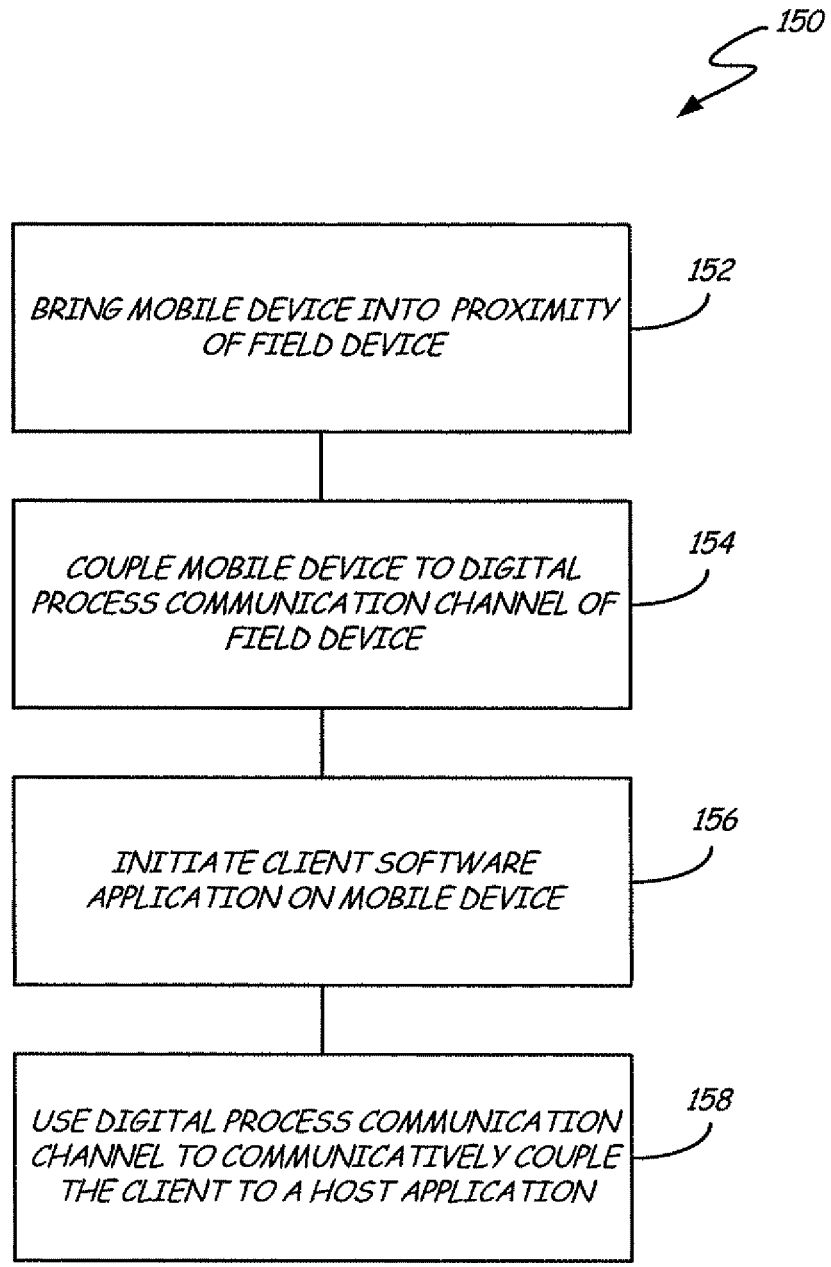
FIG. 5 is a flow diagram of a method of interacting with a process control system using a mobile device in accordance with an embodiment of the present invention.

FIG. 5 is a flow diagram of a method 150 of interacting with a process control system using a mobile device in accordance with an embodiment of the present invention. Method 150 begins at block 152 where a mobile device, such as a handheld field maintenance tool, is brought into physical proximity of a field device. At block 154, the mobile device is coupled to the digital process communication channel of the field device. As set forth above, this may be either a wired or a wireless coupling. At block 156, a client software application is initiated on the mobile device. This application may be a remote terminal, or any other suitable client. At block 158, the client software application is communicatively coupled to a host application through the communication channel of the field device.

While handheld field maintenance tools have generally been synchronized with asset management systems, they have not typically had access to historical or other information regarding the instruments being examined while the handheld field maintenance tools were used in the field. Applications such as AMS Device Manager contain a wealth of asset information not usually stored on the handheld field maintenance tool. Such information includes current and historical configuration data, device changes, current and historic alert information, product data sheets, current and historical calibration information as well as user-entered information such as drawings and notes. All such information can now be accessed quickly and easily by the technician while in the field with the handheld field maintenance tool. This can help provide the field maintenance worker with information to ensure that the best possible decisions can be made relative to the duties that are being performed in the field. In addition, this kind of activity may allow the actions being performed in the field to initiate actions within the asset management system, such as the logging of events or alerts, recording of manual steps being performed, as well as the initiation of work requested to a higher-level application such as a Computer Maintenance Management Systems (CMMS). Moreover, asset management systems are available to continuously monitor assets in the plant environment over fieldbus networks, and have the abilities to detect field changes and alert information. However, to date, there has not been a mechanism for a user or technician connected to one of those networks in the field to actually become a client to the asset management system over the fieldbus network. While the thin-client description has been provided with respect to the Windows-based operating systems, those skilled in the art will recognize that other thin-clients are possible. Moreover, the thin-client executing within handheld field maintenance tool 122 may be configured to access a plurality of different servers within the control room or process control network. Thus, a vast array of new functions can be easily performed by the field maintenance worker, while in the field, that traditionally required a second operator seated at the workstation, such as work station 126.

Although the present invention has been described with reference to preferred embodiments, workers skilled in the art will recognize that changes may be made in form and detail without departing from the spirit and scope of the invention.

What is claimed is:

1. A method of interacting with a process control system, the method comprising:
   providing a handheld field maintenance tool that complies with an intrinsic safety specification;
   bringing a the handheld field maintenance tool into physical proximity of a field device;
   coupling the handheld field maintenance tool to a digital process communication channel of the field device;
   initiating a client software application on the handheld field maintenance tool; and
   using the digital process communication channel to communicatively couple the client software application to an asset management software application remote from both the handheld field maintenance tool and the field device.

2. The method of claim 1, wherein coupling the handheld field maintenance tool to the digital process communication channel of the field device includes a wired connection.

3. The method of claim 2, wherein the handheld field maintenance tool communicates through the wired connection using a process industry standard communication protocol.

4. The method of claim 1, wherein coupling the handheld field maintenance tool to the digital process communication channel of the field device includes a wireless connection.

5. The method of claim 4, wherein the handheld field maintenance tool communicates through the wireless connection using a process industry standard communication protocol.

6. The method of claim 1, wherein the client software application is a thin-client software application.

7. The method of claim 1, wherein a display of the host application is provided on the display of the handheld field maintenance tool and wherein user input to the handheld field maintenance tool is injected into the host application.

8. The method of claim 1, wherein the host application executes on a workstation in a control room.

9. The method of claim 1, wherein the client application accesses the asset management system to automatically initiate an action in the asset management system.

10. The method of claim 1, wherein the handheld field maintenance tool communicates with the host application to automatically document a field change to create a permanent record of at least one task performed using the mobile device.

11. The method of claim 1, wherein the handheld field maintenance tool communicates with the host application to automatically generate a work order via the host application.

12. The method of claim 1, wherein the handheld field maintenance tool communicates with the asset management software application to coordinate loop checkout across multiple assets in the field.

13. A process control system comprising:
a workstation disposed in a control room and running a host application;
a field device coupled to a process and communicatively coupled to the workstation through a process communication loop; and
a handheld field maintenance tool in physical proximity to the field device and communicatively coupled to the process communication loop, the handheld field maintenance tool running a client application that communicates with the host application through the process communication loop.

14. The process control system of claim 13, wherein the handheld field maintenance tool complies with an Intrinsic Safety specification.

15. The process control system of claim 14, wherein the client application running on the handheld field maintenance tool provides remote terminal services.

16. The process control system of claim 15, wherein the remote terminal services provide a display on the handheld field maintenance tool that corresponds with a display of the workstation.

17. The process control system of claim 15, wherein user inputs to the handheld field maintenance tool are transferred to the workstation.

* * * * *